(12) United States Patent
Van Os et al.

(10) Patent No.: US 11,125,420 B2
(45) Date of Patent: Sep. 21, 2021

(54) ARRANGEMENT FOR SUSPENDING A LIGHTING DEVICE

(71) Applicant: SIGNIFY HOLDING B.V., Eindhoven (NL)

(72) Inventors: Jacobus Petrus Johannes Van Os, Eindhoven (NL); Boudewijn Ruben De Jong, Eindhoven (NL); Kenneth Van Kogelenberg, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/769,620

(22) PCT Filed: Nov. 27, 2018

(86) PCT No.: PCT/EP2018/082619
§ 371 (c)(1),
(2) Date: Jun. 4, 2020

(87) PCT Pub. No.: WO2019/110358
PCT Pub. Date: Jun. 13, 2019

(65) Prior Publication Data
US 2020/0318817 A1    Oct. 8, 2020

(30) Foreign Application Priority Data

Dec. 5, 2017 (EP) .................................. 17205411

(51) Int. Cl.
*F21S 8/02* (2006.01)
*F21V 21/04* (2006.01)
(Continued)

(52) U.S. Cl.
CPC ............ *F21V 21/045* (2013.01); *B33Y 10/00* (2014.12); *B33Y 40/20* (2020.01); *F21S 8/026* (2013.01); *F21V 21/044* (2013.01)

(58) Field of Classification Search
CPC ...... F21S 8/026; F21V 21/044; F21V 21/045; B33Y 10/00; B33Y 40/20
See application file for complete search history.

(56) References Cited

U.S. PATENT DOCUMENTS 7,722,227 B2 * 5/2010 Zhang ..................... F21V 21/04
362/364
8,096,686 B2 * 1/2012 Wilcox ................... F21V 21/04
362/365

(Continued)

FOREIGN PATENT DOCUMENTS

AU    2013202102 B1    12/2013
EP       2846076 A1     3/2015
(Continued)

*Primary Examiner* — Arman B Fallahkhair
(74) *Attorney, Agent, or Firm* — Daniel J. Piotrowski (57) ABSTRACT

An arrangement (100) and method for suspending a lighting device is provided. The arrangement comprises a spring element (110) having a central, U-shaped portion (120) and a first and a second coil (130a, 130b) extending from a respective first and second leg (140a, 140b) of the central portion and along an axis (A) parallel to a base (145) of the portion. The coils, in an unbiased state of the spring element, are spaced apart by a first distance (d) along the axis (A). The arrangement further comprises a housing (200) comprising a first and a second cavity (210a, 210b) spaced apart by the first distance (d) for fitting accommodation of the first and second coil, respectively. The arrangement further comprises a support element (300) arranged between the first and second cavities and configured to confine the first and second coil within the first and second cavity, respectively.

8 Claims, 5 Drawing Sheets (51) Int. Cl.
  *B33Y 40/20*   (2020.01)
  *B33Y 10/00*   (2015.01)

(56)            References Cited

U.S. PATENT DOCUMENTS

| | | | |
|---|---|---|---|
| 9,310,036 | B1 | 4/2016 | Kathawate et al. |
| 9,939,136 | B2* | 4/2018 | Vidal ..................... F21K 9/232 |
| 10,041,654 | B1* | 8/2018 | Ernst ....................... F21V 17/02 |
| 10,302,261 | B2* | 5/2019 | Wu ......................... F21S 8/026 |
| 10,598,352 | B2* | 3/2020 | Zeng ..................... F21V 21/046 |
| 10,801,681 | B1* | 10/2020 | Chaimberg ............ F21V 21/03 |
| 10,816,173 | B2* | 10/2020 | Vlad ....................... F21S 8/026 |
| 2010/0039829 | A1* | 2/2010 | Tsai ........................ F21V 29/67 |
| | | | 362/373 |
| 2013/0120963 | A1* | 5/2013 | Holland ................ F21V 7/0066 |
| | | | 362/84 |
| 2014/0268801 | A1 | 9/2014 | Madden et al. |
| 2015/0085499 | A1 | 3/2015 | Mandy et al. |
| 2015/0338077 | A1* | 11/2015 | Johnson ................. H05B 47/19 |
| | | | 362/234 |
| 2017/0059102 | A1 | 3/2017 | Grant |

FOREIGN PATENT DOCUMENTS

| | | | |
|---|---|---|---|
| FR | 1336501 | A | 8/1963 |
| JP | 2009104958 | A | 5/2009 |
| JP | 2015118786 | A | 6/2015 |
| KR | 20170001116 | A | 1/2017 |

* cited by examiner

ARRANGEMENT FOR SUSPENDING A LIGHTING DEVICE

CROSS-REFERENCE TO PRIOR APPLICATIONS

This application is the U.S. National Phase application under 35 U.S.C. § 371 of International Application No. PCT/EP2018/082619, filed on Nov. 27, 2018, which claims the benefit of European Patent Application No. 17205411.6, filed on Dec. 5, 2017. These applications are hereby incorporated by reference herein.

FIELD OF THE INVENTION

The present invention generally relates to the field of lighting arrangements. More specifically, the present invention relates to an arrangement for suspending a lighting device, wherein at least a portion of the arrangement may be produced by a 3D-printing process.

BACKGROUND OF THE INVENTION

Additive manufacturing, sometimes also referred to as 3D printing, refers to processes used to synthesize a three-dimensional object. 3D printing is rapidly gaining popularity because of its ability to perform rapid prototyping without the need for assembly or molding techniques to form the desired article.

By using a 3D-printing apparatus, the article or object may be built in three dimensions in a number of printing steps that are usually controlled by a computer model. One of the most widely used 3D-printing processes is Fused Filament Fabrication (FFF). FFF printers often use a thermoplastic filament which in its molten state is ejected from a nozzle of the printer. The material is then placed layer by layer, to create a three-dimensional object. FFF printers are relatively fast and can be used for printing objects of various kinds, even those having relatively complex structures.

The concept of 3D printing may be useful in many areas, e.g. in the production of LED luminaires and/or lighting solutions. It will be appreciated that the ability to integrate mechanical components, which are commonly used in 3D-printed constructions of luminaires and/or lighting solutions, is highly desirable.

For example, one or more metal springs are commonly integrated in lighting arrangements for various purposes.

JP-2015/118786 discloses discloses a downlight that can be installed into a ceiling. The dowlight has a mounting component with a pair of attachment springs, which are attached to sides of a radiation section that is part of a heat sink. The attachment springs are each attached to a spring attachment portion provided on each of the sides of the radiation section, and they are rotatable in a circular arc manner in insertion-pulling directions with the spring attachment portion as a fulcrum. The attachment springs each include a support portion having a restoring force that becomes higher as the support portion rotates more in the insertion direction.

JP-2009/104958 also discloses a downlight that can be installed into a ceiling, wherein the dowlight has a body and a pair of torsion springs in a support means. The body has a flange for making contact to a surface of the ceiling. Winding portions of the torsion springs are supported by spring end brackets of the support means. Spring ends of the torsion springs are supported by winding brackets of the support means. The torsion springs further have arm portions extending from other ends of the winding portions, and pressing portions that are bent from the arm portions and that can be contacted resiliently with a back surface of the ceiling.

To be able to hold the spring(s), a bracket of the object may be created when 3D-printing the object, whereby end portions of the spring may be inserted into the bracket. However, it should be noted that bracket arrangements of this kind in the prior art are often associated with one or more problems. First, it should be noted that assembling the spring into the bracket may be relatively difficult. For example, special tools may be needed in case of a manual fitting and/or fastening of the spring into the bracket. Moreover, in case a spring, arranged in a bracket, is biased, the spring may tend to come out of the bracket. This may lead to damages of the lighting arrangement and/or injuries of the assembling staff. Furthermore, even in case there may be provided one or more holes in the bracket and/or object for fastening the spring and thereby trying to overcome one or more of the above deficiencies, these holes may lead to a deteriorated lighting arrangement. For example, the quality and/or strength of the lighting arrangement may decrease, and moist, water, debris and/or insects may furthermore enter into the holes. Moreover, the provisions of holes of this kind may deteriorate the aesthetic and/or physical appearance of the lighting arrangement.

Hence, alternative solutions are of interest of providing a lighting arrangement which may be easily assembled and disassembled, and which operation may be safe and convenient.

SUMMARY OF THE INVENTION

It is an object of the present invention to mitigate the above problems and to provide an arrangement for suspending a lighting device, e.g. in an aperture of a ceiling, and a method of producing such an arrangement.

This and other objects are achieved by an arrangement and a method having the features in the independent claims. Preferred embodiments are defined in the dependent claims.

Hence, according to a first aspect of the present invention, there is provided an arrangement for suspending a lighting device. The arrangement comprises a spring element and a housing accommodating at least a portion of the spring element. The spring element has a U-shaped central portion. The spring element further comprises a first and a second coil extending from a respective first and second leg of the central portion and along a first axis parallel to a base of the portion. The coils, in an unbiased state of the spring element, are spaced apart by a first distance along the first axis. The housing comprises a first and a second cavity spaced apart by the first distance for fitting accommodation of the first and second coil, respectively. The housing further comprises a support element arranged between the first and second cavities and configured to confine the first and second coil within the first and second cavity, respectively. The housing also comprises a first and a second passage extending along a second axis perpendicular to the first axis and into the first and a second cavity, respectively. The first and second passages are configured to guide the first and second coils into the first and second cavities, respectively, upon an arrangement of the spring element into the housing. The support element comprises at least one flange extending from the support element along the first axis. The at least one flange has a wedge-shape along the second axis. The at least one flange is configured to support at least a portion of the respective first and second coil. The at least one flange is also configured to narrow the first and second passages along the second axis.

According to a second aspect of the present invention, there is provided a method of producing the arrangement according to the first aspect. The method comprises the steps of providing the spring element, forming the housing, and inserting the spring element into the housing by arranging the first and second coil in the first and second cavity, respectively. The step of forming the housing is performed by a 3D-printing process.

Thus, the present invention is based on the idea of providing an arrangement for suspending a lighting device, wherein the spring element of the arrangement is securely fastened in the housing of the arrangement. It will be appreciated that the support element conveniently and efficiently contributes to the stability of the arrangement by contravening any undesired movement of the coils out of the cavities and/or along the axis along which the coils are arranged. It should be noted that this ability of the arrangement of the present invention to secure the spring element in the housing is of particular importance during a biasing of the spring element, e.g. in order to suspend a lighting device by means of the arrangement. In arrangements according to the prior art, e.g. comprising a spring arranged in a bracket, the spring may easily come out of the bracket during the biasing or tensioning of the bracket, which may lead to damages of the arrangement and/or injuries of the assembling staff. In contrast, the spring element is conveniently secured in the arrangement of the present invention, leading to a safer, more practical and/or more efficient arrangement for suspending a lighting device.

The present invention is advantageous in that the arrangement is easily assembled and de-assembled whilst ensuring secure and convenient operation of the arrangement. It will be appreciated that the spring element may be easily mounted in the housing of the arrangement, either manually or with a tool.

Compared to prior art configurations comprising one or more holes in the bracket and/or object for fastening the spring, the present invention is advantageous in that its quality and/or strength is superior compared to prior art arrangements. Furthermore, the physical appearance of the arrangement of the present invention may be more aesthetically pleasing than the aforementioned configurations of the prior art.

The present invention is further advantageous in that the housing of the arrangement may be conveniently produced by a 3D-printing process.

It will be appreciated that the mentioned advantages of the arrangement of the first aspect of the present invention also hold for the method according to the second aspect of the present invention.

According to the first aspect of the present invention, there is provided an arrangement for suspending a lighting device. The arrangement comprises a spring element having a U-shaped central portion. Hence, the central portion of the spring element may be shaped as a bracket. The spring element further comprises a first and a second coil extending from a respective first and second leg of the central portion and along a first axis parallel to a base of the portion. The coils, which may be spiral-shaped, are hereby arranged along the same axis, and are furthermore spaced apart by a first distance along the axis. The arrangement further comprises a housing arranged to accommodate at least a portion of the spring element.

The housing comprises a first and a second cavity spaced apart by the first distance for fitting accommodation of the first and second coils, respectively. Hence, the coils of the spring element are accommodated, arranged or mounted within the respective cavity of the housing.

The housing further comprises a support element arranged between the first and second cavities, wherein the support element is configured to confine the first and second coil within the first and second cavity, respectively. In other words, the support element is arranged to limit or mitigate a movement of the coils from the cavities and/or in the direction of the first axis A.

The housing further comprises a first and a second passage extending along a second axis perpendicular to the first axis along which the coils are arranged, and into the first and second cavity, respectively. The first and second passages are configured to guide the first and second coil into the first and second cavity, respectively, upon an arrangement of the spring element into the housing. This is advantageous in that the first and second cavities provide a convenient arrangement of the spring element into the housing, thereby leading to an even easier assembly and/or de-assembly of the arrangement.

The support element comprises at least one flange extending from the support element along the first axis along which the coils of the spring element are arranged. The at least one flange has a wedge-shape along the second axis perpendicular to the first axis along which the coils are arranged.

The at least one flange is configured to support at least a portion of the respective first and second coil. This is advantageous in that the flanges of the support element may even further contribute to the retention of the coils in the cavities of the arrangement. It will be appreciated that the flanges may be particularly suitable for the purpose of retaining the coils in position in case of a force is applied to the U-shaped central portion of the spring element. Hence, the flanges may avoid that the coils of the spring element are pushed out of the housing as a result of a force, in an arbitrary direction, applied to the U-shaped central portion.

The at least one flange is further configured to narrow the first and second passages along the axis. This is advantageous in that it may contribute to the fixation of the coils in the cavities. More specifically, the one or more wedge-shaped flanges may bias the spring element along the axis along which the coils are arranged upon insertion of the spring element into the housing. When the coils of the spring element have passed the flanges, the spring element may flex back to its unbiased state, such that the coils may, at least partially, be supported by the flanges. This is further advantageous in that it even further contributes to the guiding of the coils of the spring element upon insertion of the spring element into the housing.

According to an embodiment of the present invention, each of the first and second coils comprises an end portion projecting perpendicular to the axis along which the first and second coils are arranged. Each cavity comprises a respective support surface configured to support the end portions of the coils upon biasing the spring element by rotation of the central portion of the spring element around the axis. Hence, the end portions of the first and second coils of the spring element may be arranged on and/or secured in the first and second support surfaces.

According to an embodiment of the present invention, the end portions of the first and second coils, in an unbiased state of the spring element, and in a plane perpendicular to the axis along which the first and second coils are arranged, are spaced in arc length from the first and second support surfaces. Upon arrangement of the end portions of the first and second coils against the respective support surface via rotation of the end portions around the axis, the spring element becomes biased around the axis. In other words, the position of the support surfaces of the arrangement leads to a pre-tensioning of the spring element upon arrangement of the end portions of the first and second coils against the first and second support surfaces, respectively. The present embodiment is advantageous in that the spring element may be pre-tensioned before a suspension and/or installation of a lighting device comprising the arrangement. The present embodiment is further advantageous in that the amount of pre-tensioning of the spring element may be conveniently adjustable by providing suitable dimension(s) and/or position(s) of the support elements of the arrangement.

According to an embodiment of the present invention, the arrangement further comprises a U-shaped locking element having a first and a second leg portion configured for mating engagement with the first and second passages of the housing. The locking element may be easily and conveniently inserted into the passages of the housing after the spring element has been inserted into the housing. The present embodiment is advantageous in that the locking element may contribute to the prevention of the spring element being pushed out of the arrangement during its operation.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
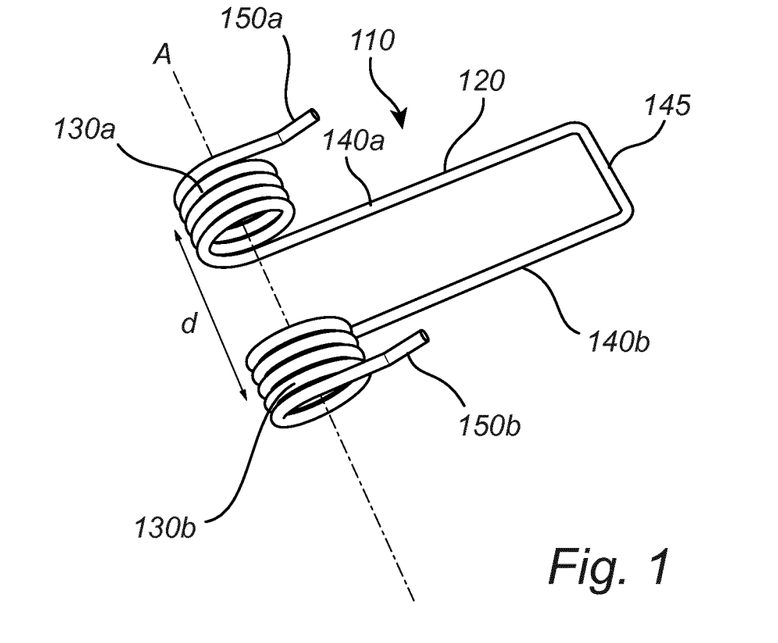
FIG. 1 is a schematic view of a spring element of an arrangement according to an exemplifying embodiment of the present invention.

FIG. 1 is a schematic view of a spring element 110 of an arrangement for suspending a lighting device according to a first aspect of the present invention. The spring element 110 has a central portion 120 which is bracket-shaped (U-shaped). The spring element 110 further comprises a first coil 130a and a second coil 130b extending from a respective first leg 140a and second leg 140b of the central portion 120. The first and second coils 130a, 130b are further arranged along a first axis A parallel to a base 145 of the central portion 120. In an unbiased state of the spring element 110, the first and second coils 130a, 130b are spaced apart by a first distance d along the first axis A. Each of the first and second coils 130a, 130b comprises a first end portion 150a and a second end portion 150b projecting perpendicular to the first axis A.

Figure 2:
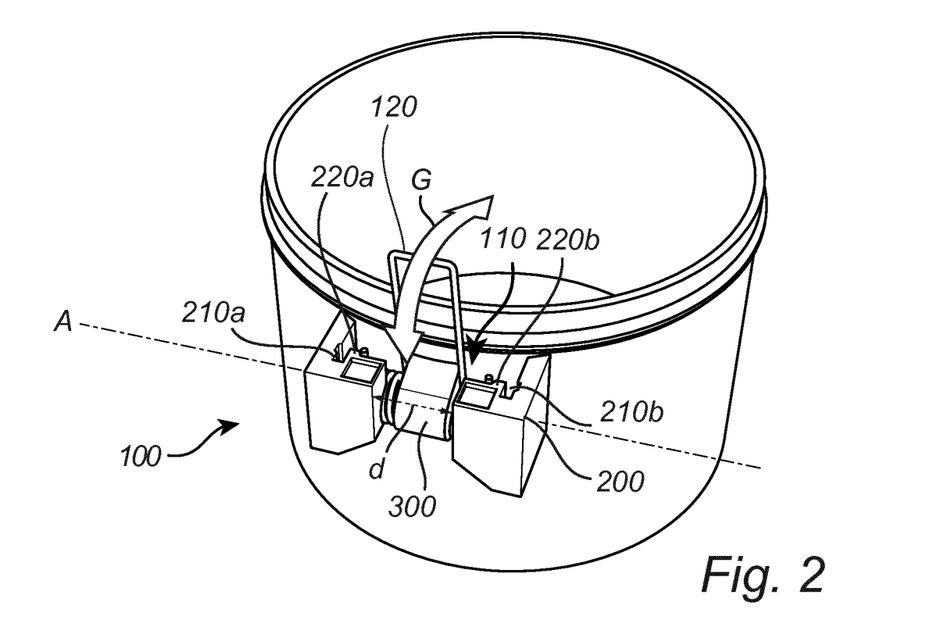
FIG. 2 is a schematic view of an arrangement according to exemplifying embodiments of the present invention.

FIG. 2 is a schematic view of an arrangement 100 according to an exemplifying embodiment of the present invention. A spring element 110, as exemplified in FIG. 1, is at least partially accommodated in a housing 200. The housing 200 comprises a first cavity 210a and a second cavity 210b in which the first coil 130a and the second coil 130b are accommodated, respectively. The first and second cavities 210a, 210b of the housing 200 are spaced apart by the first distance d separating the first and second coils 130a, 130b such that the first and second coils 130a, 130b are fittingly accommodated in the first and second cavities 210a, 210b. The central portion 120 of the spring element 110, which central portion 120 acts as a lever for biasing the first and second coils 130a, 130b, extends out of the housing 200.

The arrangement 100 in FIG. 2 further comprises a support element 300 of the housing 200. The support element 300 is arranged between the first cavity 210a and the second cavity 210b along the first axis A. The support element 300 is configured to confine the first and second coils 130a, 130b accommodated within the first and second cavities 210a, 210b, respectively. It will be appreciated that the support element 300, by its arrangement between the first and second coils 130a, 130b and between the first and second cavities 210a, 210b of the housing 200, may mitigate any movement of the first and second coils 130a, 130b upon operation of the arrangement. More specifically, upon biasing (tensioning) the spring element 110 by rotation G of the central portion 120 of the spring element 110 around the first axis A, the support element 300 may mitigate movement(s) of the first and second coils 130a, 130b along the first axis A and/or any movement of the first and second coils 130a, 130b out of the first and second cavities 210a, 210b of the housing 200.

According to the exemplifying embodiment of the housing 200 of the arrangement 100 shown in FIG. 2, each of the first and second cavities 210a, 210b comprises a respective first support surface 220a and second support surface 220b. As each of the first and second coils 130a, 130b may comprise a respective end portion 150a, 150b projecting perpendicular to the first axis A, the first and second support surface 220a, 220b may be configured to support the first and second end portions 150a, 150b of the first and second coils 130a, 130b, respectively, upon biasing the spring element 110 by rotation G of the central portion 120 of the spring element 110 around the first axis A.

Figure 3A:
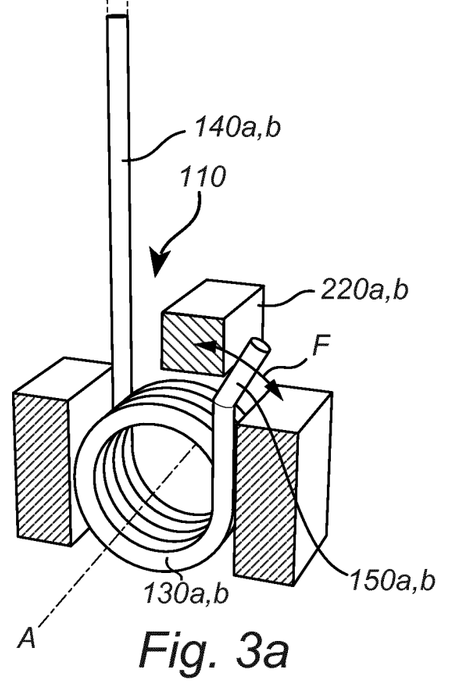
FIGS. 3a-b are schematic views of a portion of the arrangement according to an exemplifying embodiment of the present invention.
Figure 3B:
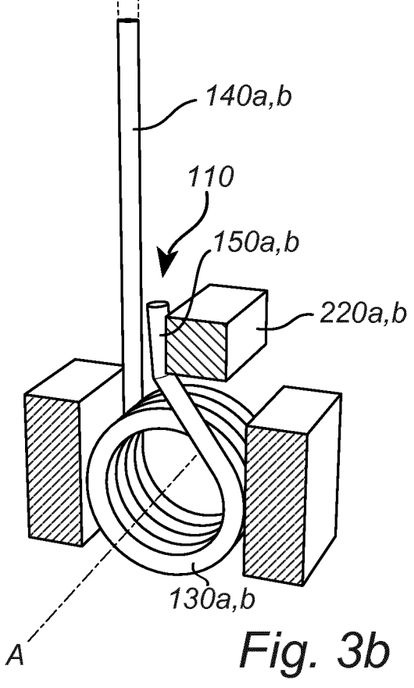

FIGS. 3a-b are schematic views of a portion of the arrangement 100 according to an exemplifying embodiment of the present invention. More specifically, FIG. 3a schematically shows one of the first and second legs 140a, 140b and one of the first and second coils 130a, 130b of the spring element 110 in an unbiased state of the spring element 110. The end portions 150a, 150b of the first and second coils 130a, 130b are spaced in arc length from the first and second support surfaces 220a, 220b in a plane perpendicular to the first axis A. Hence, via a rotation F of the end portions 150a, 150b around the first axis A, the end portions 150a, 150b may be arranged to bear against (and/or to be supported by) the first and second support surfaces 220a, 220b, as schematically shown in FIG. 3b. Consequently, the spring element 110 in FIG. 3b is biased or pre-tensioned by the provision of the first and second end portions 150a, 150b onto the first and second support surfaces 220a, 220b. It will be appreciated that the amount of biasing or pre-tensioning of the spring element 110 may be determined by the positioning and/or formation of the first and second support surfaces 220a, 220b. The amount of biasing or pre-tensioning of the spring element 110 may furthermore be determined by the spring coefficient of the first and second coils 130a, 130b.

Figure 4:
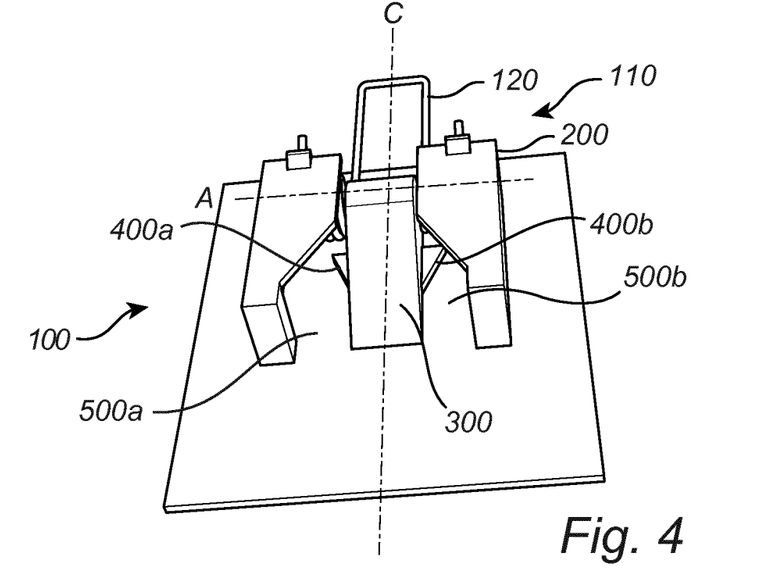
FIG. 4 is a schematic view of an arrangement according to exemplifying embodiments of the present invention.

FIG. 4 is a schematic view of an arrangement 100 according to exemplifying embodiments of the present invention. It will be appreciated that FIG. 4 may constitute the same, or a similar, arrangement 100 as shown in FIG. 1, but shown from a different angle of view compared to FIG. 1. The support element 300 of the housing 200, which support element 300 is arranged between the first and second cavities 210a, 210b, comprises two flanges 400a, 400b extending from either side of the support element 300 along the first axis A. The flanges 400a, 400b are exemplified as having wedge-shapes. The flat ends of the flanges 400a, 400b facing the cavities 210a, 210b are configured to support at least a portion of the respective first and second coil 130a, 130b. The housing 200 of the arrangement 100 further comprises a first and a second passage 500a, 500b extending parallel to a second axis C perpendicular to the first axis A. The first and second passage 500a, 500b extend into the first and second cavity 210a, 210b, respectively. The first and second passages 500a, 500b are configured to guide the first and second coils 130a, 130b into the first and second cavities 210a, 210b, respectively, upon arranging the spring element 110 into the housing 200 of the arrangement 100. The spring element 110 may be arranged into the housing 200 by pulling the central portion 120 of the spring element 110 in the direction E. Furthermore, the first and second flanges 400a, 400b are configured to narrow the first and second passages 500a, 500b along the second axis C. The wedge-shaped first and second flanges 400a, 400b may furthermore temporarily bias the spring element 110 along the first axis A upon insertion of the spring element 110 into the housing 200. Upon insertion of the spring element 110 into the housing 200, it will be appreciated that when the first and second coils 130a, 130b of the spring element 110 have passed the first and second flanges 400a, 400b, and the first and second coils 130a, 130b have entered into the first and second cavities 210a, 210b, respectively, the spring element 110 may flex back to its unbiased state along the first axis A. In this state of the spring element 110, the first and second coils 130a, 130b may, at least partially, be supported by the first and second flanges 400a, 400b.

Figure 5:
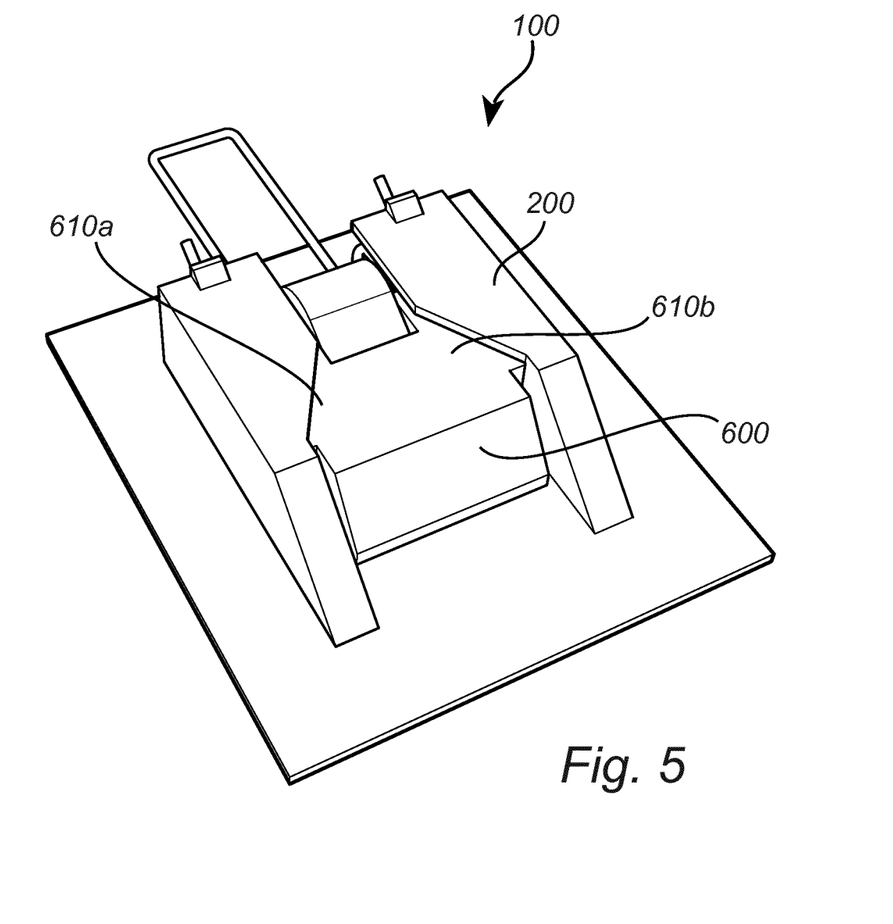
FIG. 5 is a schematic view of an arrangement according to exemplifying embodiments of the present invention.

FIG. 5 is a schematic view of an arrangement 100 according to an exemplifying embodiment of the present invention. It will be appreciated that FIG. 5 may constitute the same, or a similar, arrangement 100 as shown in FIG. 1 and FIG. 4, but shown from a different angle of view. Here, the arrangement 100 further comprises a U-shaped locking element 600 having a first leg portion 610a and a second leg portion 610b. The first and second leg portions 610a, 610b of the locking element 600 are matingly engaged with the first and second passages 500a, 500b of the housing 200 of the arrangement 100 for securing the first and second coils 130a, 130b in the respective first and second cavities 210a, 210b of the housing 200.

Figure 6A:
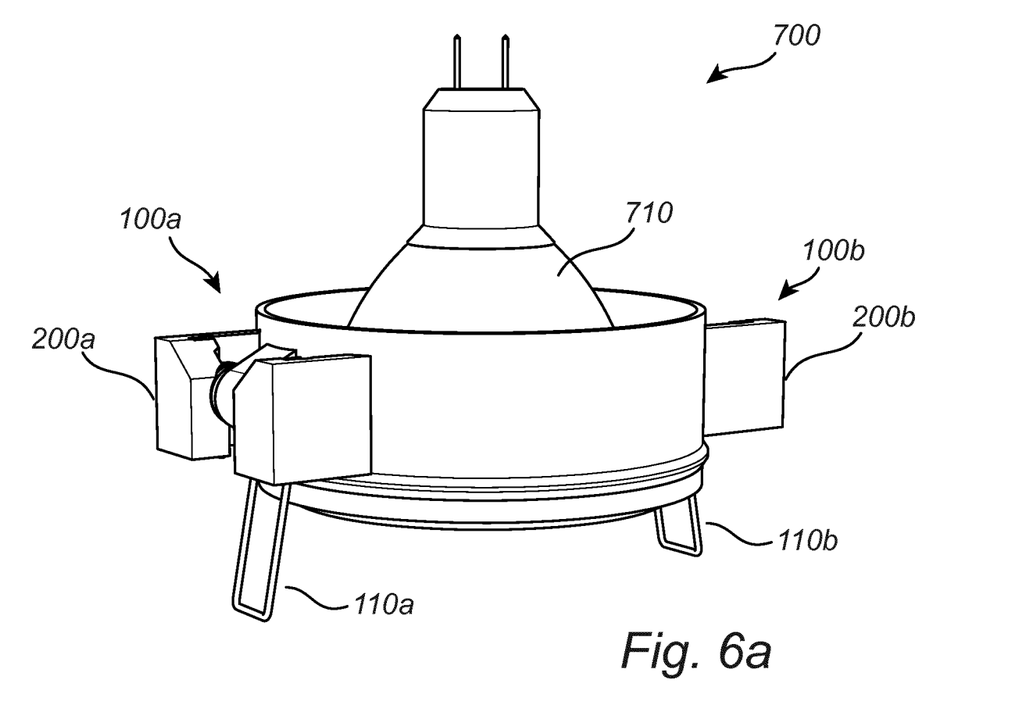
FIGS. 6a-b are schematic views of a luminaire comprising an arrangement according to an exemplifying embodiment of the present invention.

FIG. 6a is a schematic view of a luminaire 700. The luminaire 700 comprises a lighting device 710 arranged to hold at least one light source. For example, the light source (s) may constitute one or more LEDs. The luminaire 700 further comprises two arrangements 100a, 100b corresponding to the previously described embodiments for suspending the lighting device 710, e.g. into a hole or recess of an indoor wall or ceiling. It will be appreciated that the lighting device 710 and the respective housings 200a, 200b of the arrangements 100a, 100b may be integrally formed into one piece, e.g. by a 3D-printing process.

Figure 6B:
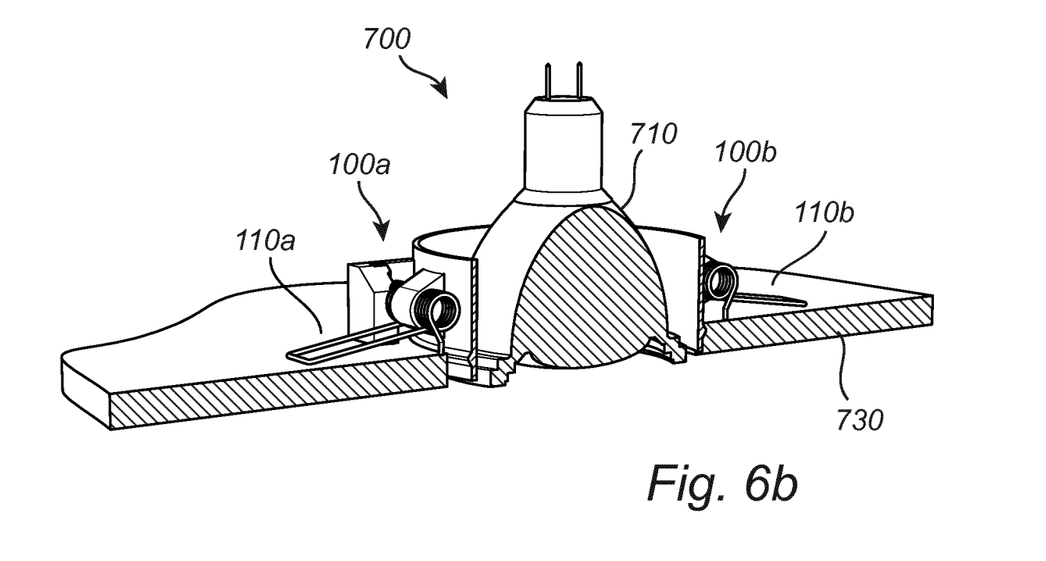

FIG. 6b is a schematic view of the luminaire 700 of FIG. 6a, wherein the lighting device 710 of the luminaire 700 is suspended in a wall or ceiling 730 via the two arrangements 100a, 100b. Notably, the respective spring elements 110a, 100b of the arrangements 100a, 100b are configured to clamp the lighting device 710 to the wall or ceiling 730 for a rigid and reliable fixation of the lighting device 710 of the luminaire 700.

Figure 7:
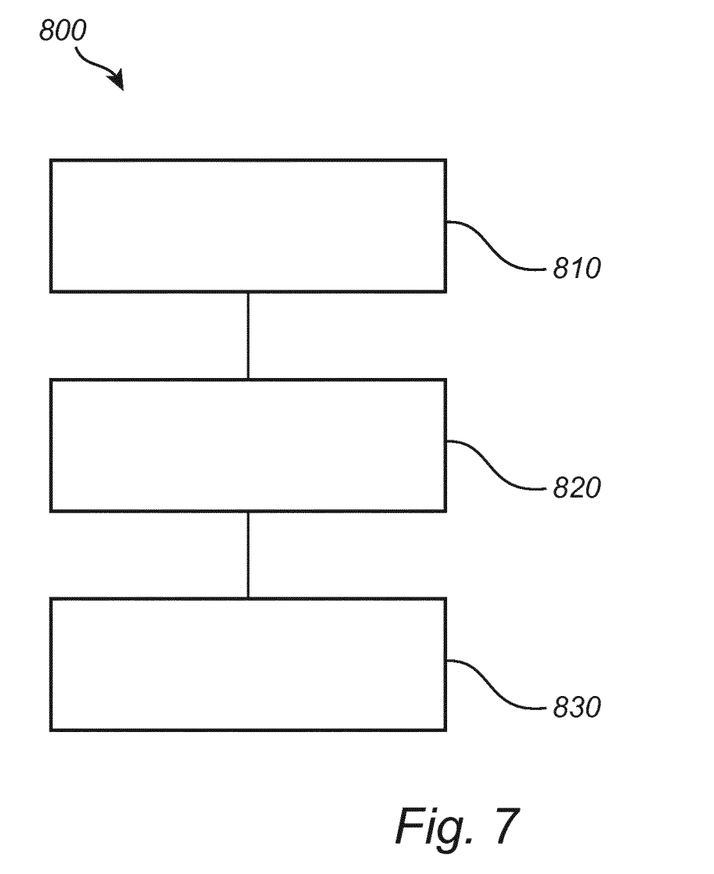
FIG. 7 is a schematic flow chart diagram of a method of producing an arrangement according to an exemplifying embodiment of the present invention.

FIG. 7 is a schematic flow chart diagram of a method 800 of producing a fastening device according to an exemplifying embodiment of the present invention. The method comprises the step of providing 810 a spring element having a central, U-shaped portion and a first and a second coil extending from a respective first and second leg of the central portion and along an axis parallel to the base of the portion, wherein the coils, in an unbiased state of the spring element, are spaced apart by a first distance d along the first axis A. The method further comprises the step of forming 820 a housing arranged to accommodate at least a portion of the spring element, the housing comprising a first and a second cavity spaced apart by the first distance for fitting accommodation of the first and second coil, respectively, and a support element arranged between the first and second cavities and configured to confine the first and second coil within the first and second cavity, respectively. It will be appreciated that the step of forming 820 a housing may be done by a 3D-printing process. The method further comprises the step of inserting 830 the spring element into the housing by arranging the first and second coil in the first and second cavity, respectively.

The person skilled in the art realizes that the present invention by no means is limited to the preferred embodiments described above. On the contrary, many modifications and variations are possible within the scope of the appended claims. For example, it will be appreciated that the figures are merely schematic views of fastening devices according to embodiments of the present invention. Hence, any elements/components of the arrangement such as the spring element 110, the housing 200, the first and/or second cavities 210a, 210b of the housing 200, etc., may have different dimensions, shapes and/or sizes than those depicted and/or described. For example, the mentioned elements/components may be larger or smaller than what is exemplified in the figures.

The invention claimed is:

1. An arrangement for suspending a lighting device, wherein the arrangement comprises a spring element and a housing accommodating at least a portion of the spring element, wherein the spring element has a U-shaped central portion and a first and a second coil extending from a respective first and second leg of the central portion and along a first axis (A) parallel to a base of the central portion, the first and a second coils being, in an unbiased state of the spring element, spaced apart by a first distance (d) along the first axis (A), wherein the housing comprises:

first and second cavities spaced apart by the first distance (d) and fittingly accommodating the first and second coils respectively, a support element arranged between the first and second cavities and configured to confine the first and second coils accommodated within the first and second cavities respectively, and first and second passages extending along a second axis (C) perpendicular to the first axis (A) and into the first and the second cavities respectively, the first and second passages being configured to guide the first and second coils into the first and second cavities respectively upon an arrangement of the spring element into the housing, wherein the support element comprises at least one flange extending from the support element along the first axis (A), the at least one flange having a wedge-shape along the second axis (C), and the at least one flange being configured to support at least a portion of the respective first and second coils, and to narrow the first and second passages along the second axis (C) to temporarily bias the spring element along the first axis (A) before the spring element is unbiased again once inserted into the housing.

2. A luminaire, comprising:

a lighting device arranged to hold at least one light source, and an arrangement according to claim 1 for suspending the lighting device.

3. The luminaire of claim 2, wherein the lighting device and the housing of the arrangement are integrally formed into one piece.

4. A method of producing an arrangement according to claim 1, wherein the method comprises the steps of:

providing the spring element;

forming the housing by a 3D-printing process; and inserting the spring element into the housing by arranging the first and second coils in the first and second cavities, respectively.

5. A method of producing a luminaire, wherein the method comprises the steps of:

forming a lighting device by a 3D-printing process, and performing the method of claim 4 in the same 3D-printing process, such that the lighting device and the housing of the arrangement for suspending the lighting device are integrally formed into one piece.

6. The arrangement according to claim 1, wherein each of the first and second coils comprises an end portion projecting perpendicular to the first axis (A), and wherein each of the first and second cavities comprises a respective support surface configured to support the end portions of the first and second coils upon biasing the spring element by rotation of the central portion of the spring element around the first axis (A).

7. The arrangement according to claim 1, wherein the end portions of the first and second coils, in an unbiased state of the spring element, and in a plane (B) perpendicular to the first axis (A), are spaced in arc length from the support surfaces, such that the spring element, upon arrangement of the end portions of the first and second coils against the respective support surface via rotation of the end portions around the first axis (A), becomes biased around the first axis (A).

8. The arrangement according to claim 1, further comprising a U-shaped locking element having a first and a second leg portion configured for mating engagement with the first and second passages of the housing.

* * * * *